United States Patent [19]  
Lalanne

[11] Patent Number: 5,169,289  
[45] Date of Patent: Dec. 8, 1992

[54] TURBOMACHINE WHEEL WITH MOUNTED BLADES

[75] Inventor: Bernard Lalanne, Pau, France

[73] Assignee: Turbomeca, Bordes, France

[21] Appl. No.: 755,309

[22] Filed: Sep. 5, 1991

[30] Foreign Application Priority Data

Sep. 11, 1990 [FR] France ................. 90 11200

[51] Int. Cl.⁵ ........................ F01D 5/32; F01D 5/30
[52] U.S. Cl. ..................... 416/220 R; 416/219 R; 416/221
[58] Field of Search ............... 416/219 R, 220 R, 221

[56] References Cited

U.S. PATENT DOCUMENTS

| | | | |
|---|---|---|---|
| 3,043,562 | 7/1962 | Van Nest et al. | 416/220 R |
| 3,295,825 | 1/1967 | Hall, Jr. | 416/220 R |
| 3,814,539 | 6/1974 | Klompas | 416/220 |
| 4,171,930 | 10/1979 | Brisken et al. | 416/220 R |
| 4,767,276 | 8/1988 | Barnes et al. | 416/221 |

FOREIGN PATENT DOCUMENTS 0905582 9/1962 United Kingdom ........... 416/219 R

Primary Examiner—Edward K. Look  
Assistant Examiner—Mark Sgantzos  
Attorney, Agent, or Firm—Martin Smolowitz

[57] ABSTRACT

Turbomachine wheel having blades mounted on a rotor including an annular peripheral ring in which are formed open axial recesses each of which receives the root of a blade. Each blade is radially retained in the recess by cooperation of complementary shapes of the fir tree type, with a direction of fitting being parallel to the axis of the rotor. The blade root is axially immobilized in the recess by a first flange and a second flange which are respectively disposed adjacent to the opposite lateral faces of the rotor, and at least partly close the opposite axial ends of the recesses for the roots of the blades. The first flange is fastened to the rotor by a bayonet type device whose lugs are formed on the first flange and are received in notches formed in the annular ring of the rotor with open ends of the notches for engagement of the lugs opening onto the transverse walls which define the recesses. The second flange is maintained in position clamped by an axial clamping ring mounted in a prestressed condition.

9 Claims, 2 Drawing Sheets

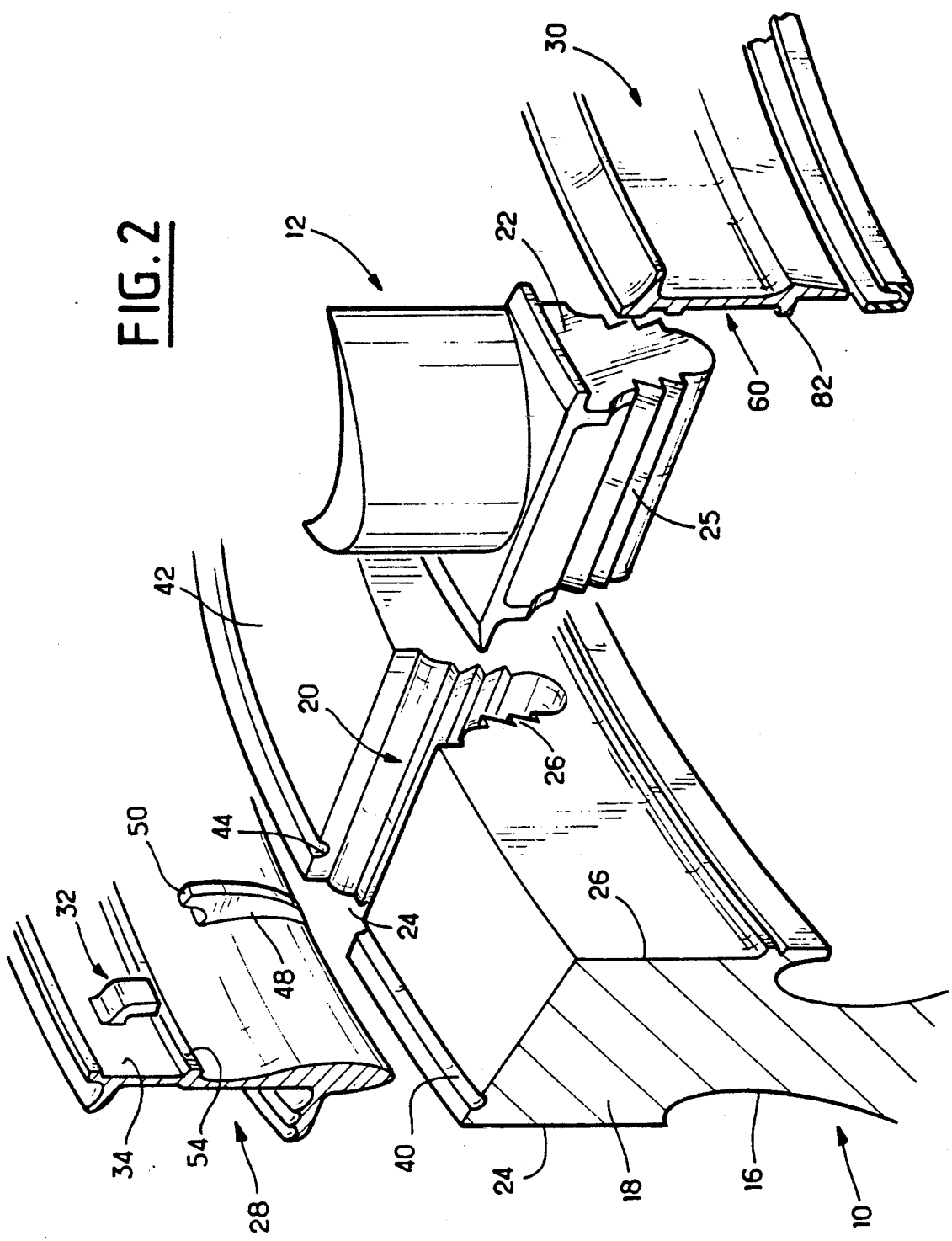

TURBOMACHINE WHEEL WITH MOUNTED BLADES

BACKGROUND OF INVENTION

The present invention relates to a turbomachine wheel having blades mounted on a rotor comprising an annular peripheral ring in which are formed open axial recesses each of which receives the root of a blade.

Each blade is radially retained in its recess so as to resist the effects of centrifugal force by cooperation of complementary shapes of the mortise-and-tenon type fastener whose fitting direction is parallel to the axis of the rotor, the root of each blade having if desired in particular in section in a radial plane, a toothed shape termed "fir tree root".

The root of each blade is axially immobilized in its recess by two annular flanges placed on the opposite sides of the rotor, the flanges at least partly closing the opposed axial ends of the recesses for the roots of the blades and thereby performing the function of closing covers for these recesses.

In the design of such a wheel of a turbomachine, and in particular of a turbine of an aircraft or helicopter engine, it is of course necessary to maintain the blades or vanes of the turbine in position as perfectly as possible so as to avoid any vibrations, in particular under the effect of centrifugal force which is considerable owing to the high speeds of rotation attained in this type of application. The annular flanges forming covers therefore perform an essential function for the turbine and must be fixed in a precise and reliable manner on the rotor on which the blades are mounted directly or indirectly.

For this purpose, it is desirable to have available flange fastening means the weight of which is reduced to a minimum. It is also desirable to be able to eliminate any connection or fastening of the screwthreaded type, for example bolts or studs and nuts, this type of fastening being particularly heavy and involving considerable risks of accidental disassembly under the effect of the vibrations.

The fastening means must also continue to perform their function under the best possible conditions and with all the required reliability at the different temperatures of operation of the turbomachine whose component parts are subjected to considerable thermal shocks.

SUMMARY OF INVENTION

An object of the invention is therefore to provide a design of a turbomachine wheel in which the fastening means for the annular cover flanges axially immobilizing the roots of the blades satisfy one or more of the conditions just mentioned.

For this purpose, the turbomachine wheel according to the invention is characterized in that a first flange is fastened to the rotor by a fastening device of bayonet type whose lugs are formed on the flange and received in notches which are formed in the annular ring of the rotor and have open ends which are provided for the engagement of the lugs and open onto the transverse walls defining the recesses for the blade roots.

According to other features of the invention:

each of the notches is a portion of a radial groove formed in the outer cylindrical surface of the annular peripheral ring of the rotor, and each lug of the bayonet fastening device comprises an end branch which extends radially toward the axis of the rotor and is received in the groove, and a connecting branch which connects the end branch to the flange;

this first lateral flange comprises a centring ring which axially projects from one of its lateral faces so as to cooperate with a corresponding centring portion formed in the confronting first lateral face of the rotor;

the second flange comprises a planar annular portion which bears axially against a corresponding planar portion of the confronting second lateral face of the rotor, these two planar annular portions being radially defined in the direction of the axis of the rotor by two tapered inner edge portions in the shape of disc portions which are maintained clamped against each other by an axial clamping ring;

the opposed outer lateral faces of the two disc portions are portions of conical surfaces of opposite angles and the clamping ring is a resiliently deformable open ring which defines a V-sectioned outer radial groove whose shape is complementary to the shape of the conical surfaces, the clamping ring being mounted radially prestressed so as to apply an axial clamping force to said planar annular bearing portions;

the second flange comprises a centring ring which axially projects from one of its lateral faces so as to cooperate with a corresponding centring portion formed in the confronting second lateral face of the rotor;

means are provided for immobilizing in rotation the second flange with respect to the rotor, and said immobilizing means may be formed for example by at least one tab which axially projects from the lateral face of the flange and cooperates with a confronting portion of one of the blades to prevent the rotation of the flange relative to the rotor.

DESCRIPTION OF INVENTION

The following description, with reference to the accompanying drawings given by way of a non-limitative example, will explain how the present invention can be carried out.

FIG. 2 is a partial exploded perspective view to a scale larger than that of the wheel shown in FIG. 1 and representing a blade and the corresponding parts of the rotor and annular flanges for receiving and immobilizing the blade in position.

Figure 1:
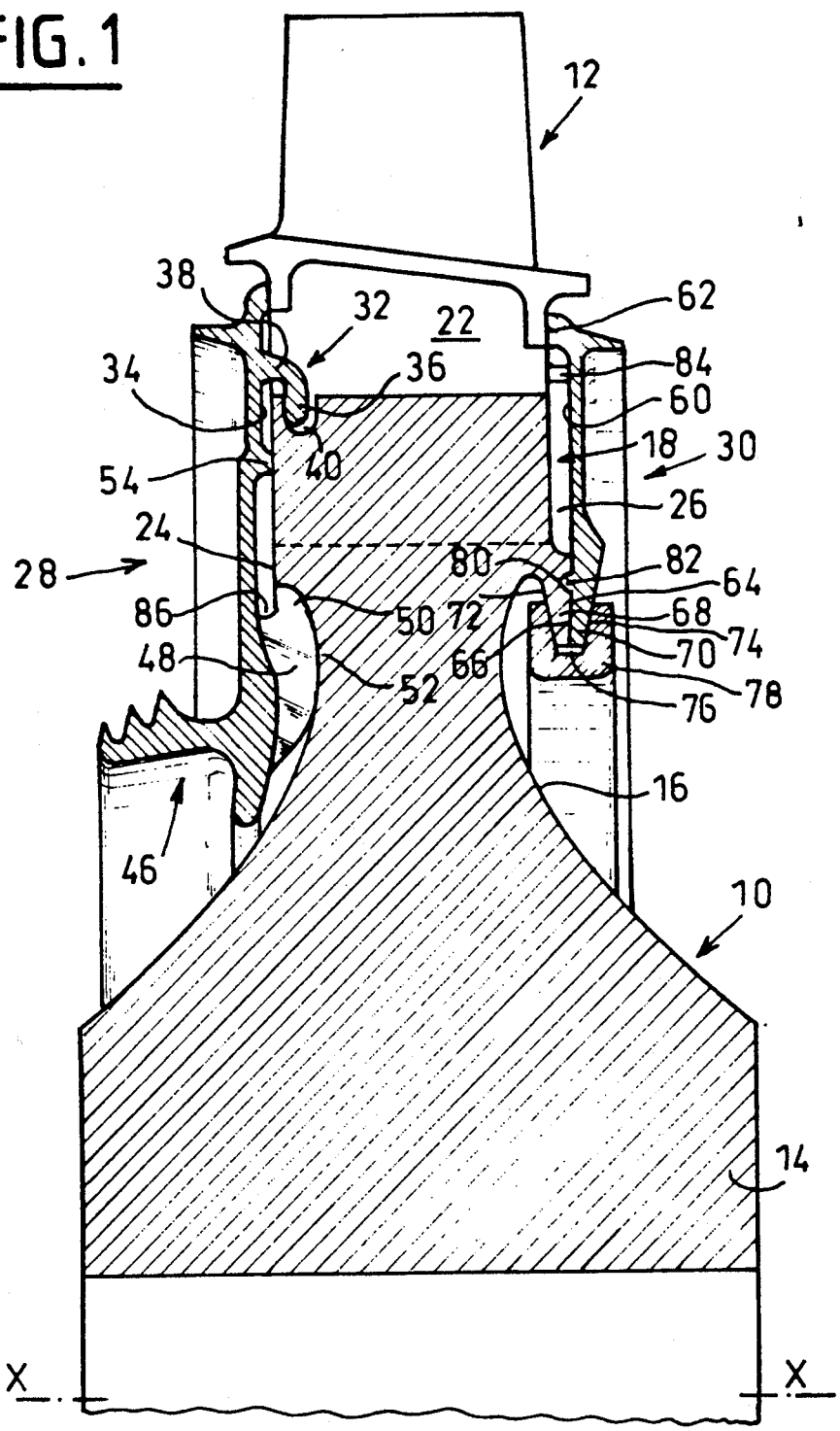
FIG. 1 is a semi-axial sectional view of an embodiment of a wheel of a turbomachine having mounted blades comprising two annular flanges which are secured by means arranged in accordance with the teaching of the invention, the wheel being shown in the assembled position.

The Figures show a turbomachine turbine wheel or disc which essentially comprises a rotor 10 having an axis X—X of rotation and mounted blades 12.

The rotor 10 comprises a central portion forming a hub 14 which is radially outwardly extended by a thinned-down median portion 16 i.e., having gradually reduced thickness and terminates in a cylindrical annular peripheral portion or ring 18.

The peripheral ring 18 comprises a series of recesses 20 adapted to receive the root 22 of each of the mounted blades 12. The recess 20 and the root 22 have complementary sections termed "fir tree root".

This assembly, of the mortise-and-tenon type conventionally employed in the construction of turbines, permits a very precise adjustment in position of the blade 12 on the rotor 10 and its immobilization in the radial direction so as to resist loads due to centrifugal force which are taken by the flanks of the teeth 25 of the fir tree root. Each recess 20 is an axially open recess, i.e. a throughway recess which opens onto the two opposed lateral faces 24 and 26 of the peripheral ring 18 of the rotor 10. In the known manner, each of the blades 12 is mounted by axially introducing the root 22 in its corresponding recess 20.

The means for axially immobilizing the roots 22 in position in their respective recesses 20 will now be described.

The blades 12 are axially immobilized in position by a first lateral flange forming a cover 28 and a second lateral flange forming a cover 30. In the illustrated design, the first lateral flange 28 is an upstream flange whereas the flange 30 is a downstream flange with reference to the direction of flow of the fluid in the turbomachine.

The flange 28 is fastened in position against the first lateral face 24 of the ring 18 by a fastening device of the bayonet type comprising a series of lugs 32 formed on the lateral face 34 of the flange 28 and cooperative with the first lateral face 24 of the rotor 10. Each lug 32 has, in section in an axial plane, an inverted L-shape and comprises an end branch 36 which extends radially toward the axis X—X of the rotor. The end branch 36 is connected to the lateral face 34 of the flange 28 by a connecting branch 38 which is substantially parallel to the axis of the rotor 10.

The recesses of the bayonet fastening device are formed by a radial groove 40 in the outer cylindrical peripheral surface 42 of the annular ring 18. The groove 40 has such section as to receive the end branches 36 of the lugs 32 which may be inserted therein through the open ends 44 of the groove 40 which open onto the transverse walls defining the blade root recesses 20.

According to the conventional design of a bayonet fastening device, the annular flange 28 is mounted by rotating the flange 28 relative to the rotor 10 so as to engage the lugs 32 in the groove 40 and produce an axial clamping effect on the flange against the first lateral face 24 of the ring 18 in particular owing to a corresponding section of the lug end branch 36.

The lateral flange 28 is extended in its lower part, i.e. below the level of the blade roots as viewed in FIG. 1, by a portion 46 on which are formed cooling fins 48 which may extend in a radial plane or make an angle with the latter. These fins 48 are limited at their radially outer edge by a centring ring 50 in the shape of an annular portion which axially projects from the lateral face 34 toward the disc or wheel 10 and cooperates with a portion 52 of complementary section of the thinned-down portion 16 of the disc. In this way, the flange 28 is centered relative to the rotor 10 when mounted on the latter.

The lateral face 34 of the flange 28 also comprises an axially projecting annular rim 54 which bears against the first lateral face 24 of the ring 18 and against the axial end faces of the roots 22 of the blades 12.

As will be explained hereinafter, the flange 28 is immobilized in rotation relative to the rotor 10 by the blade roots 22 which, in the assembled position, close the open ends 44 of the groove 40 for the insertion of the lugs 32 and therefore in this way prevent any escape and accidental disassembly of the flange 28.

The second or downstream lateral flange 30 comprises, on its lateral face 60 facing toward the second lateral face 26 of the rotor peripheral ring 18, an upper axial rim 62 for bearing against confronting portions of the blades 12.

The flange 30 is fastened in position on the rotor 10 by the following means.

Two annular bearing portions 64 and 66 are respectively formed on two extensions 68 and 70 of the rotor peripheral ring 18 and flange 30. Each of the extensions 68, 70 is a ring-shaped portion of the rotor 10 and flange cover 30 which radially extends toward the axis X—X of the rotor.

The outer lateral faces 72 and 74 of the portions 68 and 70 are two portions of conical surfaces having opposite tapers so that, in the assembled position illustrated in FIG. 1, the assembly has substantially a V-shaped outer section.

The two portions 68 and 70 are received in a radially outer groove 76 of an axial clamping ring 78. The groove 76 also has a V-shaped section in an axial plane complementary to that of the face surfaces 72 and 74.

The groove 76 is deep enough to ensure that the radially inner edges of the extension portions 68 and 70 do not abut against the bottom of the groove 76.

The clamping ring 78 is a resiliently deformable and open ring in the manner of a resilient ring or circlip which is mounted in an inner radial groove of a bore.

The ring 78 is mounted on the extension portions 68 and 70 in a resiliently prestressed state, i.e. with an internal stress tending to increase its diameter and produce an axial clamping effect on the planar bearing portions 64 and 66 owing to the cooperation of the inclined flanks of the groove 76 with the conical portions 72 and 74 with a wedging effect.

The second flange 30 is centered relative to the rotor 10 by a projecting annular portion 80 which is received in a corresponding groove 82 in the rotor.

For the purpose of immobilizing the flange 30 in rotation relative to the rotor 10, the lateral face 60 of the flange 30 may include one or more tabs 84 which extend axially toward the rotor and are provided to cooperate with confronting portions of the blades 12.

A wheel of a turbomachine arranged in accordance with the teaching of the invention is assembled in the following manner.

The wheel assembly operator starts by mounting the upstream flange or cover 28 onto the rotor 10 by means of its bayonet fastening lug device 32. A rotation through an angle of $2\pi/2N$ radians, if N is the number of blades 12, enables the lugs 32 to be inserted in the groove 40. After this operation, the flange 28 is axially immobilized and centered relative to the rotor 10.

The operator then mounts the blades 12 by inserting their roots 22 in the recesses 20, which has for effect to close the open ends 44 of the groove 40 and thereby prevent any disassembly of the annular flange 28.

The operator then centers and places the flange forming the downstream cover 30 against the second lateral face 26 of the rotor 10 and axially immobilizes it by placing the clamping ring 78 in position.

After these operations, the roots 22 of the blades 12 are axially immobilized by the two flanges forming covers 28 and 30 which close the open ends of the recesses 20.

In operation, when the wheel of the turbine rotates at high speed, any accidental disassembly of the first flange 28 is impossible owing to the action of the bayonet mounting, and the centrifugal force acting on the clamping ring 78 has for result to increase the effect of the axial clamping of the second downstream flange 30 against the lateral face 26 of the rotor 10.

As illustrated in FIG. 1, the upstream flange 28 and downstream flange 30 comprise portions which axially extend them toward the stream of air so as to ensure a seal with the internal cavity of the turbomachine.

In the case of turbine blades having an internal circulation of air for cooling them, the cooling air compressed in the upstream cover 28 can travel through the passage 86 formed in the region of the centring ring 50. The compressed air then enters the turbine blade, either through orifices provided on the upstream face of the blade, or in the lower part of the latter. In the latter case, an air passage must be provided in the lower part of the last tooth of the fir tree root of each blade.

What is claimed is:

1. A turbomachine wheel comprising a rotor having an axis of rotation and including an annular peripheral ring, axially opposite first lateral face and second lateral face, radially open and axially extending recesses having axially opposite open ends provided in said ring, blades having roots, said roots being respectively mounted in said recesses, complementary shapes of mortise-and-tenon type on said roots and said recesses cooperative to radially retain said roots in said recesses, a first lateral flange and a second lateral flange respectively disposed adjacent to said first lateral face and said second lateral face of said rotor for axially immobilizing said roots in said recesses and at least partly closing said axially opposite open ends of said recesses, a fastening device of bayonet type interposed between said rotor and said first flange, said fastening device comprising lugs provided on said first flange and notches provided in said ring and having open ends for the insertion and engagement of said lugs, said open ends of said notches opening onto transverse walls defining said recesses.

2. A turbomachine wheel according to claim 1, wherein each of said notches is a portion of a radial groove formed in an outer cylindrical surface of said ring, and each lug comprises an end branch which radially extends toward said axis of said rotor and is received in said groove, and a connecting branch which connects said end branch to said first flange.

3. A turbomachine wheel according to claim 1, wherein said first lateral flange comprises a centring ring which axially projects from a lateral face of said first flange, and a corresponding centring portion formed in said adjacent first lateral face of said rotor is cooperative with said centring ring.

4. A turbomachine wheel according to claim 1, wherein said second lateral flange comprises a planar annular portion which axially bears against a corresponding planar annular portion of said lateral second lateral face of said rotor, said two planar annular portions being radially defined in a direction toward said axis by two tapered inner edge portions in the shape of disc portions, and a clamping ring engages said inner edge portions for clamping said inner edge portions against each other.

5. A turbomachine wheel according to claim 4, wherein said opposite outer lateral faces of said two disc portions are conical surface portions having opposite tapers and said clamping ring is a resiliently deformable split ring which comprises an outer radial groove having a V-shaped section complementary to the section of said conical surface portions, said clamping ring being mounted in a radially prestressed condition so as to apply an axial clamping force to said annular bearing portions.

6. A turbomachine wheel according to claim 4, wherein said second flange comprises a central ring portion which axially projects from a lateral face of said flange, and a corresponding centering groove portion formed in said adjacent second lateral face of said rotor is cooperative with said centering ring portion of said second flange.

7. A turbomachine wheel according to claim 4, comprising means for immobilizing in rotation said second flange relative to said rotor.

8. A turbomachine wheel according to claim 7, wherein said means for immobilizing in rotation comprise at least one tab which axially projects from said second flange and is cooperative with a confronting portion of one of said blades so as to prevent rotation of said second flange relative to said rotor.

9. A turbomachine wheel comprising a rotor having an axis of rotation and including an annular peripheral ring 18, axially opposite first lateral face 24 and second lateral face 26, radially open and axially extending recesses 20 having axially opposite open ends provided in said ring, blades 12 having roots 22, said roots being respectively mounted in said recesses 20, complementary shapes of mortise-and-tenon type on said roots and said recesses cooperative to radially retain said roots 22 in said recesses 20, a first lateral flange 28 and a second lateral flange 30 respectively disposed adjacent to said first lateral face 24 and said second lateral face 26 of said rotor 10 for axially immobilizing said roots 22 in said recesses 20 and at least partly closing said axially opposite open ends of said recesses, a fastening device of bayonet type interposed between said rotor and said first flange, said fastening device comprising lugs 32 provided on said first flange 28 and notches 40 provided in said ring 18 and having open ends 44 for the insertion and engagement of said lugs 32, said open ends 44 of said notches opening onto transverse walls defining said recesses 20, each of said notches 40 being a portion of a radial groove 40 formed in an outer cylindrical surface of said ring, and each lug 32 comprises an end branch which radially extends toward said axis of said rotor and is received in said groove, and wherein said second lateral flange 30 comprises a planar annular portion which axially bears against a corresponding planar annular portion of said lateral second lateral face 26 of said rotor, said two planar annular portion 64, 68 being radially defined in a direction towards said axis by two tapered inner edge portions 72, 74 in the shape of disc portions, and a clamping ring 78 engages said inner edge portions for clamping said inner edge portions against each other.

* * * * *